3,560,395
AQUEOUS KETONE PEROXIDE-HYDROGEN PEROXIDE COMPOSITION
Solomon Crigg Westbrook, Jr., Buffalo, N.Y., assignor to Pennwalt Corporation, a corporation of Pennsylvania
No Drawing. Filed Sept. 12, 1968, Ser. No. 792,179
Int. Cl. C08f 1/60
U.S. Cl. 252—186                           13 Claims

ABSTRACT OF THE DISCLOSURE

A peroxide solution composition consisting essentially of a single alkanone peroxide, hydrogen peroxide, water, and organic solvent; having an active oxygen content of about 5–16%; the peroxide content having been prepared by reaction of the total alkanone and hydrogen peroxide in aqueous medium, which peroxidation product mixture becomes part, or all, of the final composition.

The peroxide solution composition is especially useful in the curing of water extended unsaturated polyester resins.

BACKGROUND OF THE INVENTION

(1) The field of the invention

This invention relates to aqueous solutions of an alkanone peroxide and hydrogen peroxide. Particularly, this invention relates to such solutions that are "safe" with respect to the Trauzl Test. Also the invention relates to such solutions that are useful in curing of water extended unsaturated polyester resins.

(2) The prior art

U.S. Patents Nos. 3,330,871 and 3,377,407 are directed to safe peroxide compositions.

In the curing of unsaturated polyester resins it is sometimes desired to have rapid gel times, relative to the cure times. Ketone peroxides generally do not give fast enough gel times, at ordinary temperatures, even when promoted. Concentrated hydrogen peroxide is known to give rapid gel times, but does not cure sufficiently. It has been observed that a physical mixture of a commercial ketone peroxide and aqueous hydrogen peroxide does give a combination of rapid gel time and satisfactory cure. However, it has also been observed that this physical mixture is more hazardous than either component alone.

Recently there have come to the market, water extendible unsaturated polyester resins which extended resins require rapid gel time and fast, hard cure at ordinary temperatures. For these resins it is necessary to have the peroxide curing agent soluble in the water portion of the mix. Ordinary commercial ketone peroxides blended with aqueous hydrogen peroxide are used in spite of some incompatibility with the water and the hazard.

OBJECT

It is the general object of this invention to provide an aqueous ketone peroxide-hydrogen peroxide composition that is compatible with water and gives both rapid gel times and fast hard cure of water extended unsaturated polyester resins and also of regular unsaturated polyester resins.

SUMMARY OF THE INVENTION

A ketone peroxide solution composition, including free hydrogen peroxide, which composition consists essentially of: (a) a total peroxide content in the range of about 15–40%; (b) a water content in the range of about 30–60%; and (c) an organic safety solvent content in the range of about 15–60%; said contents being weight percent based on total composition and adding essentially to 100%. The organic safety solvent is a carbon-hydrogen compound including at least one O, N, P or S atom which is inert to said peroxides, and is sufficiently water soluble to afford a solution composition. The composition is further characterized by (i) an active oxygen content in the range of about 5–16%, (ii) an apparent free hydrogen peroxide content of about 0.25–2.0 times the ketone peroxide content, and (iii) a one spot paper chromatogram. The peroxide content of said composition is obtained by peroxidation of alkanone having 3–8 carbon atoms with hydrogen peroxide in an aqueous medium, in the absence of a catalyst, with said aqueous medium forming at least a part of the water and organic solvent content of said composition, said aqueous medium and said peroxides are not separated after said peroxidation.

Example of one such formulation:

| | Percent |
|---|---|
| 2,2-dihydroperoxybutane | 6.2 |
| Hydrogen peroxide (pure) | 18.6 |
| Water | 51.3 |
| Tergitol NPX | 3.1 |
| N-methyl-2-pyrrolidone | 3.1 |
| Propylene glycol | 17.7 |

React 140 grams (1.94 moles) methyl ethyl ketones with 1680 grams hydrogen peroxide-50% or 840 grams (24.72 moles) hydrogen peroxide (pure). Complete peroxidation of the methyl ethyl ketone to the 2,2-dihydroperoxy butane, requires 3.88 moles of hydrogen peroxide (pure). There remains in the solution 709 grams (20.86 moles) hydrogen peroxide (pure), or 18.6% of the final solution, i.e., after the NPX, pyrrolidone, glycol and additional water had been added to the peroxidation reaction product mixture—a clear, homogeneous solution was obtained. Hydrogen peroxide content of the solution was determined analytically. This result was compared to the calculated value.

$H_2O_2$: Calculated, 18.6%; found, 5.6%. This wide difference in hydrogen peroxide content between calculated value and the 5.6% actually determined value, suggests that some of the hydrogen peroxide in the formulation is held as a peroxide complex.

The novel solution compositions of the invention are especially useful with the new types of polyester-alkylurethane resins now being marketed which contain up to 60 percent water. These resin systems are designed for uses requiring very rapid gels and hard cures. The initiators and catalysts used must be compatible with and readily miscible with both the aqueous and the organic portions of the resins mixture. An example of these water extendible resins is Aropol WEP resin. (Ashland Chemical Company, Columbus, Ohio). In this system, the peroxide is added to the water; promoters and activators are added to the organic phase. The two phases are then mixed to obtain a rapid curing material. Thus, the peroxide agent must be introduced easily, either by prior mixing or by continuous introduction, into the water stream. The composition of the invention meets this requirement.

DESCRIPTION OF THE INVENTION AND EXAMPLES

A methyl ethyl ketone peroxide and hydrogen peroxide containing aqueous formulation was prepared by blending a commercial aqueous MEK peroxide formulation having an active oxygen content of 11.4 and sufficient 50% hydrogen peroxide solution to produce a blended composition having an active oxygen of 18.8. This blend is effective in curing water extended, 60%, unsaturated polyester resin mixed with styrene monomer at ordinary temperatures giving fast gel time and a very hard cured resin. However the Trauzl Test of this blend is 75 which is a completely unacceptable value for shipment or ordinary storage.

The Trauzl Test was developed in Germany for use with explosives. This test is based on the same principle as the Lead Pipe Deformation Test (LPD). The Trauzl Test is considerably more informative than the LPD Test because it provides a quantitative measure of the energy afforded by the decomposing material.

The Trauzl Test results set out herein were obtained using the following procedure, which is a modified version of the test developed in Germany. The tests were carried out using a pure lead rod, 2 inches diameter by 2¾ inches long having a 1 inch diameter by 2¼ inch long hole centered therein.

6.0 grams of peroxide is weighed into a 3 dram vial having a plastic cap with an opening to permit entry of a No. 8 Du Pont electric blasting cap. The blasting cap is positioned inside the vial and is attached to electrical leads. The vial and blasting cap are placed in the lead rod; the assembly is placed in a test pit and the blasting cap is detonated from a safe distance. The volume of the cavity in the lead block is measured before and after the detonation using water as the measuring medium. The increase in the volume of the cavity, as an average of duplicate runs, is the Trauzl Test No. for the particular material. The duplicate runs must check within 2 milliliters; if the difference is greater than 2 ml., additional tests are made. Expansions of almost 100 mls. can be measured without bursting the lead block.

Trauzl Test numbers, which normally drop the ml., for various materials are given:

| | |
|---|---|
| Water | 7.0 |
| 50% hydrogen peroxide | 23.0 |
| DDM (MEK peroxides 11.0% active oxygen) | 21.0 |
| L-1 (aqueous MEK peroxide active oxygen 11.4) | 11.5 |
| Benzoyl peroxide (70% wet) | 9.0 |
| Benzoyl peroxide (99%) | 28.0 |
| Ammonium nitrate | 40.0 |
| Diisopropyl peroxydicarbonate | 55.0 |

The composition of the invention consists essentially of alkanone peroxide, hydrogen peroxide, water and an organic safety solvent which composition has been prepared in a certain hereinafter defined manner, and having certain hereinafter set out characteristics.

The composition is characterized by an active oxygen content in the range of about 5–16%; usually in the range of 8–12%.

The peroxide distribution when determined by paper chromatography of the composition of the invention shows a one spot ketone peroxide paper chromatogram. The paper chromatography analysis is further discussed in connection with the examples presented in this specification. The total peroxide content, i.e., ketone peroxide plus hydrogen peroxide, of the composition of the invention is in the range of about 15–40%; usually in the range of about 23–30%.

The composition of the invention contains a major amount of water in order to assist in solubility in the water portion of water extended resins. The water content of the composition of the invention is in the range of about 30–60%; usually in the range of 40–55%.

The composition of the invention includes an organic safety solvent which is inert to the peroxides present and is sufficiently water soluble so that the composition of the invention is a clear homogeneous solution composition.

The organic safety solvent content of the composition of the invention is in the range of about 15–60%; usually in the range of about 15–30%.

The enumerated components of the composition are given as weight percent based on total composition and these add essentially to 100%. Minor amounts of other materials such as surfactants may be present. Ordinarily these will be present in amounts less than 5% of the total composition.

The organic safety solvent present in the composition of the invention is a carbon-hydrogen compound including at least one oxygen, nitrogen, phosphorus, or sulfur atom. The defined solvent is inert to, i.e., does not react with or promote the decomposition of, the peroxides present in the composition. The defined safety solvent is sufficiently water soluble to afford a solution composition i.e., the peroxide, water and solvent mutually dissolve to form a clear homogeneous solution.

The classes of preferred organic liquid solvents which have substantial solubility in water are described in more detail as:

(1) Lower alkanols.—These have 1–4 carbon atoms. Illustrative are methanol, ethanol, isopropanol, n-butyl alcohol and t-butyl alcohol.

(2) Lower glycols.—These have 2–8 carbon atoms. Illustrative are ethylene glycol; propylene glycol; 1,4-butanediol; 2-butene-1,4-diol; hexanediol and octanediol.

(3) Ether glycols.—All the ether glycols are very water soluble and are suitable for use as solvents in this invention. Illustrative are diethylene glycol, dipropylene glycol, tetraethylene glycol, and the polyglycols in general. Higher molecular weight polyethylene glycols are available under the trademark designation Carbowax, e.g. Carbowax 200–200 M.W.

(4) Saturated heterocyclic diethers having only carbon, hydrogen and oxygen atoms and 3–4 carbon atoms in the ring.—Illustrative are dioxane and dioxolane.

(5) Lower alkyl esters of lower alkanols, lower glycols and ether glycols.—Lower alkyl has 1–6 carbon atoms. Illustrative are methyl acetate, ethyl acetate, methyl propionate, ethyl butyrate, ethylene glycol monoacetate, ethylene glycol diacetate, hexanediol dipropionate, butanediol dihexanoate, and Carbowax 200 diacetate.

(6) Saturated monohydric ether alcohols having a total of 4–8 carbon atoms.—Illustrative are tetrahydrofurfuryl alcohol and Pentoxol (4-methoxy-4-methyl pentanol-2).

(7) Lower alkyl esters of phosphoric acid.—Illustrative are dimethyl phosphate, triethyl phosphate and tributyl phosphate.

(8) N-R-2-pyrrolidone where R is alkyl having 1–4 carbon atoms.—Illustrative is N-methyl-2-pyrrolidone.

(9) R'-ethers of lower glycols and ether glycols where R' is lower alkyl or phenyl.

(10) Mono-R'-ether, mono-lower alkyl ester of lower glycols and ether glycols where R' is lower alkyl or phenyl.

Illustrative of 9 and 10 are the surfactant "Tergitol" NPX (nonyl phenyl polyethylene glycol ether), and the compounds sold under the trademark designation "Cellosolve" and "Carbitol." Typical of these are: butyl "Cellosolve" (ethylene glycol monobutyl ether); butyl "Cellosolve" acetate (ethylene glycol monobutyl ether acetate); "Cellosolve" acetate (ethylene glycol monoethyl ether acetate); "Cellosolve" (ethylene glycol monoethyl ether); dibutyl "Cellosolve" (ethylene glycol dibutyl ether); n-hexyl "Cellosolve" (ethylene glycol monohexyl ether); methyl "Cellosolve" (ethylene glycol monomethyl ether); methyl "Cellosolve" acetate (ethylene glycol monomethyl ether acetate); phenyl "Cellosolve" (ethylene glycol monophenyl ether; butyl "Carbitol" (diethylene glycol monobutyl ether); butyl "Carbitol" acetate (diethylene glycol monobutyl ether acetate); "Carbitol" acetate (diethylene glycol monoethyl ether acetate); "Carbitol" (diethylene glycol dibuty ether); diethyl "Carbitol" (diethylene glycol diethyl ether); n-hexyl "Carbitol" (diethylene glycol monohexyl ether); methyl "Carbitol" (diethylene glycol monomethyl ether).

(11) Di-R''-alkali metal sulfosuccinate where R'' is alkyl and has 6–16 carbon atoms. These compounds are surfactants and are illustrated by "Monowet" MT70 (ditridecyl sodium sulfosuccinate).

The ketone peroxide content of the composition of the invention is derived from alkanones having 3–8 carbon atoms. An alkanone is an alkane having a keto group present. Illustrative ketones are acetone; diethyl ketone; methyl ethyl ketone (MEK); methyl isopropyl ketone; ethyl isopropyl ketone; methyl butyl ketone; ethyl butyl ketone; dipropyl ketone; propyl butyl ketone and propyl amyl ketone. Preferred ketones are diethyl ketone, methyl ethyl ketone and ethyl isopropyl ketone.

The composition of the invention presents an unusual analytical problem. The calculated hydrogen peroxide content and the hydrogen peroxide content by the usual analytic procedures do not agree. Hydrogen peroxide "found" is always substantially lower than the calculated hydrogen peroxide content. It is believed that the hydrogen peroxide not found by the usual analytical procedures is complexed in some way with the ketone peroxide present.

The composition of the invention includes an apparent free hydrogen peroxide content [also referred to as "found" hydrogen peroxide]. For simplicity, apparent free hydrogen peroxide content of the composition is defined as about 0.25–2.0 times the ketone peroxide content; usually about 0.5–1.5.

The preferred apparent free hydrogen peroxide content is indirectly defined by using in the process of preparation of the composition of the invention in the peroxidation step a mole ratio of hydrogen peroxide charged to alkanone charged in the range of about 10–17 to 1. Usually this mole ratio is the range of about 11–13 to 1.

The composition of the invention must be prepared by a process wherein all of the defined ketone and all of the hydrogen peroxide are present in the peroxidation reaction zone. The peroxidation reaction is carried out in an aqueous medium. This medium may include one or more of the organic solvents intended to be present in the final composition. The medium may in fact be the final water-organic solvent content of the composition or form a part of the water and organic solvent content of the final composition. The peroxidation reaction is carried out in the manner known to the art for reactions of the defined ketone and hydrogen peroxide solutions. The peroxidation reaction is carried out in the absence of a catalyst. Peroxidation of the defined ketone under these conditions results in the production of only one ketone peroxide component rather than a mixture of ketone peroxide components such as are present in commercial MEK peroxide compositions.

The hydrogen peroxide which is charged to the peroxidation reaction may be any of the hydrogen peroxide solutions available in commerce, for example the water solutions containing 27% hydrogen peroxide, 50% hydrogen peroxide, and 70% hydrogen peroxide. The particular concentrate used will be determined in part by the desired water content and the final composition. Or a more concentrated hydrogen peroxide solution may be used and the additional water needed added after the peroxidation reaction. It is to be emphasized that the peroxidation production reaction mixture is the final composition desired or becomes a part of the final composition when the additional desired water and/or organic solvent is added thereto. It is emphasized that the peroxide content of the peroxidation reaction product is not separated from the aqueous medium before the final composition of the invention is prepared.

EXAMPLES

Preparation embodiments

The following exemplary solutions were prepared by the general procedure: Methyl ethyl ketone and a small amount of water or hydrophilic solvent were placed into a glass reactor equipped with stirrer, thermometer and external cooling. The hydrogen peroxide solution was added slowly at 0 to 2° C. After the addition was completed, the temperature was raised to 12 to 14° C. and the material was stirred at this temperature for 30 minutes. The remaining water and solvents were then added to obtain a clear, homogeneous solution of the desired concentration. No mineral acid or ion exchange resin catalyst was used; no catalyst is used in the process.

PREPARATION I (1–64)

| Materials: | G. |
|---|---|
| Methyl ethyl ketone [1.94 moles] | 140 |
| Water | 140 |
| Hhydrogen peroxide —50% [24.72 moles] | 1680 |
| Tergitol NPX® | 120 |
| N-methyl-2-pyrrolidone | 120 |
| Propylene glycol | 676 |
| Water | 950 |

Procedure: The 140 g. of methyl ethyl ketone and 140 g. water were placed into the reactor. The hydrogen peroxide —50 percent was added. The mixture was stirred at 12 to 14° C. for 30 minutes. The remaining water and the solvents were added to obtain a clear homogeneous solution.

Active oxygen: 10.6%
Paper chromatogram: 1 spot

Complete peroxidation of the methyl ethyl ketone to the 2,2-dihydroperoxybutane, requires 3.88 moles of hydrogen peroxide (pure). There remains in the solution 709 grams (20.86 moles) hydrogen peroxide (pure), or 18.6% of the final solution. Hydrogen peroxide content of the solution was determined analytically. This result was compared to the calculated value.

$H_2O_2$: 18.6% calculated; 5.6% found.

This wide difference in hydrogen peroxide content between 18.6% calculated value and the 5.6% actually determined, indicates that the hydrogen peroxide is held in a complex state with the MEK peroxide.

Taking into account the production of water in the peroxidation reaction, the final solution composition was calculated to be:

| Materials: | Percent |
|---|---|
| 2,2-dihydroperoxybutane | 6.2 |
| Hydrogen peroxide (pure) | 18.6 |
| Water | 51.3 |
| Tergitol NPX® | 3.1 |
| N-methyl-2-pyrrolidone | 3.1 |
| Propylene glycol | 17.7 |

Analysis of the peroxidation product by gas chromatography showed the presence of less than 0.5% of residual unreacted methyl ethyl ketone; this shows that virtually all of the MEK had in fact reacted at these conditions.

PREPARATION II (1–69)

| Materials: | G. |
|---|---|
| Methyl ethyl ketone [0.19 mole] | 14 |
| Water | 28 |
| Hydrogen peroxide —70% [2.4 moles] | 120 |
| Water | 48 |
| Dipropylene glycol | 38 |

Procedure: The 14 g. of methyl ethyl ketone and 28 g. water were placed into the reactor and cooled to 0° C. Hydrogen peroxide —70 percent was added. The mixture was stirred at 12 to 14° C. for 30 minutes. The solvents were then added to obtain a clear homogenous solution.

Active oxygen: 16.1%
Paper chromatogram: 1 spot

PREPARATION III (1–72)

| Materials: | G. |
|---|---|
| Methyl ethyl ketone [0.19 mole] | 14 |
| Hydrogen peroxide —70% [2.47 moles] | 120 |
| Carbowax 200® | 105 |

Procedure: The 21 g. of methyl ethyl ketone and 15 g. of the Carbowax 200® were placed into the reactor. Hydrogen peroxide —27 percent was added at 0 to 2° C. The mixture was stirred at 12 to 14° C. for 30 minutes. The remaining 90 g. Carbowax 200® was added to obtain a clear homogeneous.

Active oxygen: 10.3%
Paper chromatogram: 1 spot

Using the exemplary procedures, compositions of the invention, identified as 1–60, 1–61, 1–62, 2–62, 1–64, 1–65, 1–69 and 1–72, were prepared. These are set forth in Table I.

COMPARISON COMPOSITION (1–95)

Comparison Composition 1–95 was prepared by blending 3 parts by weight of commercial 50% hydrogen peroxide (Trauzl Test: 23) and 1 part by weight of a commercial MEK peroxide composition, identified herein as L–1. L–1 had the following composition:

| Material: | percent, weight |
|---|---|
| MEK peroxides | 45 |
| Water | 27 |
| Tergitol NPX® | 5 |
| N-methyl-2-pyrrolidone | 5 |
| Propylene glycol | 18 |

It had the following inspections:

Active oxygen: 11%
Paper chromatogram: 3 spots
Trauzl Test: 11.5

The 3:1 blend assayed 18.8% active oxygen; had a paper chromatogram of 3 spots and a Trauzl Test of 75.

The paper chromatograms demonstrate that the addition of hydrogen peroxide subsequent to the peroxidation does not affect the polymeric peroxide components once they have been formed. The spots of the blend are of reduced intensity owing to the dilution of L–1 with aqueous hydrogen peroxide.

Composition 1–95 is an effective curing agent (see Table I) but the Trauzl No. is too high. Dilution of 1–95 to an active oxygen content of 10–12%, to decrease the Trauzl No. sharply decreased the curing effectiveness and also resulted in incompatibility—the composition showed a phase separation.

PAPER CHROMATOGRAPHY

The following articles are of interest to the following discussion of the paper chromatographic analyses.

Nicholas A. Milas and Alexander Golubovic, J. Am. Chem. Soc., 81, 5824 (1959).

Nicholas A. Milas and Igor Belic, J. Am. Chem. Soc., 81 3358 (1959), "Studies in Organic Peroxide XXIII. The Use of Paper Chromatograph for the Detection and Separation of Organic Peroxides."

J. Cartlidge and C. F. H. Tipper, Anal. Chim. Acta, 22, 106 (1960) (The Netherlands) "Analysis of Peroxides. Separation and Identification by Paper Chromatography."

J. Cartlidge and C. F. H. Tipper, Chem. & Ind., 1959 pp. 852–853, "Analysis of Peroxides. Separation and Identification by Paper Chromatography."

Nicholas A. Milas and Igor Belic, "Studies in Organic Peroxide XXVII," Presented Before the 135th Meeting of the American Chemical Society, Atlantic City, N.J., Sept. 17, 1959.

Paper Chromatography is based on the principle that every chemical compound possesses a definite and reproducible affinity for some other chemical materials or solvent systems. This is peculiar to the particular substance such as a "fingerprint."

Two solvents or solutions that are immiscible are selected. The paper strip is treated with one solvent. (Stationary solvent). A tiny spot or drop of the material to be tested is placed on the paper near one end. The paper is then positioned on end such that the tip is immersed in a vessel containing the second solvent (mobile solvent) just below the sample spot. The mobile solvent then irrigates up the paper carrying the sample spot along but at a slower rate than the solvent front. As the mobile solvent irrigates up the paper the spot is pulled by two opposing forces. The cellulose paper and stationary solvent tries to hold the spot in position. The mobile solvent tries to carry it along the paper.

The actual distance to which the spot moves is dependent upon the relative affinity it has for the two phases. Solvents are selected to allow partial movement of the spot and to effect separation of the several components of a mixture or solution.

The extent of migration of the sample spot is usually expressed in terms of "$R_f$" value. This is the ratio of the distance of migration of the spot to the distance of movement of the solvent front.

$$R_f = \frac{\text{distance travelled by spot}}{\text{distance travelled by solvent front}}$$

Thus, if the spot moves halfway, $R_f = 0.50$.

After irrigation, the second problem is identifying the sample. For this purpose the paper strip is usually sprayed with a suitable indicator to form a Visual Chromatogram. Quantitative methods have been developed which are based on estimation of spot intensity as compared with certain color standards which contain known amounts of product.

The method is unique in that it has been used successfully to separate very closely related compounds which are alike in most of their other properties. For example, chromatography has been used widely to separate and identify simple sugars such as glucose, fructose and mannose. These materials all have essentially the same molecular weights and empirical formulate, differing only in their steric chemistry.

In the case of methyl ethyl ketone peroxides, chromatography is the best tool available for separating the several peroxidic components usually produced from the reaction of methyl ethyl ketone with hydrogen peroxide.

Two Methods are required:

Method I

This method follows the procedure of Cartlidge and Tipper. Cellulose paper on a glass plate (modified thin layer) serves as the stationary phase. A solution of 50% chloroform and 50% petroleum ether (B.P.=80 to 100° C.) serves as the mobile phase.

In this method the hydrogen peroxide remains at the starting point and *all* the methyl ethyl ketone peroxides move up the paper.

$H_2O_2$: $R_f = 0.00$ to $0.05$
MEK Peroxides: $R_f = 0.85$ to $0.98$

TABLE I.—CURING TESTS

|  | 1-60 | 1-61 | 1-62 | 2-62 | 1-64 | 1-65 | 1-69 | 1-72 | 1-95* |
|---|---|---|---|---|---|---|---|---|---|
| Active oxygen, percent | 14.1 | 14.2 | 12.3 | 7.1 | 10.6 | 10.5 | 16.1 | 10.3 | 18.8 |
| Spots | 1 | 1 | 1 | 1 | 1 | 1 | 1 | 1 | 3 |
| Composition: |  |  |  |  |  |  |  |  |  |
| MEK peroxides plus $H_2O_2$ | 35 | 35 | 30 | 20 | 25 | 26 | 40 | 26 |  |
| Water | 35 | 35 | 42 | 58 | 51 | 53 | 45 | 56 |  |
| Terigitol NPX | 4 | 4 | 3 | 3 | 3 | 3 |  |  |  |
| N-methyl-2-pyrrolidone | 4 | 4 | 3 | 3 | 3 | 3 |  |  |  |
| Propylene glycol | 22 |  | 22 |  | 18 | 15 |  |  |  |
| Dipropylene glycol |  | 22 |  | 16 |  |  | 15 |  |  |
| Carbowax 200 |  |  |  |  |  |  |  | 18 |  |
| Curing results: |  |  |  |  |  |  |  |  |  |
| Gel time, min | 1.7 | 1.6 | 1.5 | 1.5 | 1.8 | 1.7 | 1.5 | 1.5 | 1.9 |
| Cure time, min | 8.2 | 8.1 | 7.8 | 7.5 | 8.3 | 8.0 | 7.8 | 7.6 | 9.7 |
| Peak exotherm °F | 160 | 160 | 160 | 159 | 154 | 156 | 160 | 160 | 155 |
| Shore hardness | 75-85 | 75-85 | 75-85 | 75-85 | 85 | 80 | 75-85 | 75-85 | 75-85 |
| Trauzl test |  | 18.5 |  |  | 13 | 13 | 18.5 |  | 75 |

*Comparison blend.

Method II

This method follows the procedure of Milas et al. In this procedure, cellulose paper saturated with a solution of 40% N,N-dimethyl formamide, 60% acetone serves as the stationary phase. Decalin (decahydronaphthalene) serves as the mobile phase. This gives the following $R_f$ results:

MEK peroxides:  $R_f$
- Monomeric component _____ 0.01
- dimeric component _____ 0.25–0.50
- trimeric component _____ 0.40–0.55
- tetrameric component _____ 0.60–0.70
- cyclic component _____ 0.85–0.98
- $H_2O_2$ _____ 0.00

Thus Method II is useful in separating one organic dihydroperoxide from another as indicated by the $R_f$ value. However, the monomeric component remains at the starting point ($R_f$=0.01), almost in the same position as hydrogen peroxide.

Thus, Method I establishes the presence of either or both hydrogen peroxide and the organic methyl ethyl ketone peroxides as a group. Method II then separates the several methyl ethyl ketone peroxide components and shows which ones are present. In both methods the paper strip is sprayed with 10% potassium iodide solution to develop the chromatogram.

By the use of Methods I and II, it is demonstrated that the compositions of the invention contain hydrogen peroxide and the single MEK peroxide, 2,2-dihydroperoxybutane.

CURING OF WATER EXTENDED RESIN

Tests were carried using the compositions of the invention set out in Table I as curing agents for a water extended resin. This resin was a commercial material sold by Ashland Chemical Company under the trade name AROPOL WEP resin. This is an unsaturated polyester-alkyl-urethane resin which is blended with styrene monomer. The resin as cured was a water-in-oil emulsion containing about 60% of water. The resin was promoted for ordinary temperature curing with 1.25% of cobalt octoate —12% and 0.50% of dimethyl aniline, both based on the resin content.

The curing was carried out according to the standard procedure of this art, using 0.5 weight percent of the peroxide composition based on water extended resin-styrene emulsion. In all cases the "resins" were at room temperature when the peroxide composition was added. The Gel Time, Cure Time, and Peak Exotherm reached was determined for each peroxide composition. The Shore hardness was determined for the cured material.

The results of the curing tests are set out in Table I. Surprisingly, all of the compositions of the invention gave substantial equal results in the tests—considering the reproducibility factor of this procedure.

Astonishingly, Table I shows that the compositions of the invention all give as good or better gel times and significantly faster cure times, at the same Shore hardness, as the comparison blend 1–95, in spite of the 18.8% active oxygen content of 1–95 as contrasted with the 7.1% active oxygen content of 2–62, for instance.

EXAMPLE 1–65

| Chemicals: | Lbs. |
|---|---|
| Propylene glycol | 4.0 |
| Methyl ethyl ketone | 3.8 |
| Hydrogen peroxide—50% | 44.8 |
| Propylene glycol | 11.4 |
| N-methyl-2-pyrrolidone | 3.0 |
| Tergitol NPX® | 3.0 |
| Water (demineralized) | 30.0 |
|  | 100.0 |

This affords a MEK/$H_2O_2$ mole ratio of 1/13.3

Operating Procedure (1) Clean the reactor and all vessels and lines thoroughly with water and methyl ethyl ketone.

(2) Place 4.0 pounds propylene glycol into the reactor.

(3) Add 3.8 pounds methyl ethyl ketone. Cool to 0° C.

(4) Add the 44.8 pounds hydrogen peroxide—50% from the feed tank slowly, with stirring, controlling the temperature at 0° C. ±2° C.

(5) After addition is complete, raise the temperature to 12° C. Stir at 12–14° C. for 30 minutes.

(6) Add the 11.4 pounds propylene glycol, 3.0 pounds N-methyl-2-pyrrolidone, 3.0 pounds Tergitol NPX® and 20.0 pounds water (demineralized). Stir for 5 minutes.

(7) Take a preliminary assay. This should be high. Adjust to 10.3 to 10.5 percent active oxygen by the addition of water (about 10.0 pounds).

| Final composition: | Percent |
|---|---|
| Methyl ethyl ketone peroxide and unreacted hydrogen peroxide | 26 |
| Water | 53 |
| Propylene glycol | 15 |
| N-methyl-2-pyrrolidone | 3 |
| Tergitol NPX® | 3 |

Active oxygen=10.5 percent
Trauzl No.: 13

Curing activity

Aropol WEP, resin formulation, 0.5% catalyst concentration.

| Gel time—mins. | 1.7 |
|---|---|
| Cure time—mins. | 8.0 |
| Peak Ex.—° F. | 156° |
| Hardness | 80 |

Stability test

| 2 days—no change | 75° C. |
|---|---|
| 5 days—no change | 50° C. |

Safety characteristics [1]

Shock Sensitivity—negative at 1 to 10 inches on the DuPont tester.
Flash point—215° F.
Burning rate—2 grams
Ignition time—590 sec.
Burning time—12 sec.
Total time—602
Flame ht.—6 inches
Pressure vessel test—5 grams
Rupture point—<1.0 mm.
Heating time—230 sec.
Rapid heat test—mild decomposition at 125° C.
Trauzl test—13.0
Hot plate test, 500° F.—decompose mildly.

[1] Detailed procedures are in U.S. Patent 3,380,871.

Contamination test $H_2SO_4$—decomposes mildly
Cobalt—decomposes mildly

CURING OF A STANDARD RESIN

Composition of the invention 1–65 and the commercial composition L–1 were compared in the curing of an unsaturated polyester resin, which is used as a standard resin for testing the curing effectiveness of peroxides. This standard resin has the composition shown in Table II.

TABLE II—STANDARD POLYESTER RESIN SYSTEM

| | Percent |
|---|---|
| Maleic anhydride, 1.0 mole | |
| Phthalic anhydride, 1.0 mole | |
| Propylene glycol, 2.2 moles | 70 |
| Acid No., 45–50 | |
| Hydroquinone, 0.013% | |
| Styrene monomer | 30 |

The resin was promoted with 0.5% of cobalt naphthenate (6%); 1.0% of the peroxide composition was used; and the test was begun at room temperature. The results of the comparative tests are in Table III.

TABLE III

| | one–65 | L–1 |
|---|---|---|
| Gel, minutes | 5.9 | 7.6 |
| Cure, minutes | 16.9 | 21.8 |
| Peak exotherm, ° F | 235 | 230 |
| Barcol hardness | 35 | 35–40 |

These tests demonstrate that the composition of the invention is effective in the curing of regular unsaturated polyester resins.

Thus, having described the invention, what is claimed is:

1. A ketone peroxide solution composition, including hydrogen peroxide, which composition consists essentially of:
   (a) a total peroxide content in the range of about 15–40%;
   (b) a water content in the range of about 30–60%; and
   (c) an organic safety solvent content in the range of about 15–60%;
      (I) said contents being weight percent based on total composition and adding essentially to 100%;
      (II) said organic safety solvent being a carbonhydrogen compound including at least one O, N, P or S atom, inert to said peroxides, and sufficiently water soluble to afford a solution composition;
      (III) said composition being further characterized by
         (i) an active oxygen content in the range of about 5–16%,
         (ii) an apparent free hydrogen peroxide content of about 0.25–2.00 times the ketone peroxide content, and
         (iii) a one spot paper chromatogram; and
      (IV) said peroxide content of said composition having been obtained by peroxidation of alkanone having 3–8 carbon atoms with hydrogen peroxide in an aqueous medium, in the absence of a catalyst, with said aqueous medium forming at least a part of the water and organic solvent content of said composition, said aqueous medium and said peroxides not having been separated after said peroxidation.

2. The composition of claim 1 where in (IV) the mole ratio of hydrogen peroxide charged to the peroxidation to alkanone charged is in the range of about 10–17 to 1.

3. The composition of claim 1 where in (III) (ii) the apparent free hydrogen peroxide content relative to ketone peroxide content is about 0.5–1.5.

4. The composition of claim 1 where in (III) (i) the active oxygen content is in the range of about 8–12%.

5. The composition of claim 1 where in (a), (b), and (c) respectively said contents are in the range of about (a) 23–30%, (b) 40–55%, and (c) 15–30%.

6. The composition of claim 1 where in (IV) said alkanone is diethyl ketone.

7. The composition of claim 1 where in (IV) said alkanone is methyl ethyl ketone.

8. The composition of claim 1 where in (IV) said alkanone is ethyl isopropyl ketone.

9. The composition of claim 1 wherein said organic solvent includes N-methyl-2-pyrrolidone.

10. The composition of claim 9 wherein said organic solvent includes the surfactant nonyl phenyl polyethylene glycol ether.

11. The composition of claim 1 wherein said organic solvent is dipropylene glycol.

12. The composition of claim 1 where said organic solvent is polyethylene glycol having a molecular weight of about 200.

13. A peroxide composition consisting essentially of:

| | Percent, about |
|---|---|
| (a) 2,2-dihydroperoxybutane | 6.2 |
| (b) hydrogen peroxide | 18.6 |
| (c) water | 51.3 |
| (d) nonyl phenyl polyethylene glycol ether | 3.1 |
| (e) N-methyl-2-pyrrolidone | 3.1 |
| (f) propylene glycol | 17.7 | said composition having an active oxygen content of 10.6%, an apparent free hydrogen peroxide content of 5.6%, and a one spot paper chromatogram; and the peroxide content of said composition having been obtained by peroxidizing methyl ethyl ketone with hydrogen peroxide, in a mole ratio of $H_2O_2$ to ketone of 12.7, said hydrogen peroxide being charged as aqueous solution, in the absence of a catalyst.

References Cited

UNITED STATES PATENTS

| 3,330,871 | 7/1967 | Mageli et al. | 260—610 |
| 3,349,040 | 10/1967 | Kressin | 252—186 |

RICHARD D. LOVERING, Primary Examiner

I. GLUCK, Assistant Examiner

U.S. Cl. X.R.

8—111; 252—99; 260—610